July 22, 1969  B. F. HAMPTON  3,456,614
TEMPERATURE-SENSITIVE DEVICES
Filed April 17, 1967

INVENTOR
BRIAN FRANK HAMPTON
BY Watson, Cole, Grindle & Watson
ATTORNEYS

United States Patent Office 3,456,614
Patented July 22, 1969

3,456,614
TEMPERATURE-SENSITIVE DEVICES
Brian Frank Hampton, Great Bookham, England, assignor to The Electricity Council, London, England
Filed Apr. 17, 1967, Ser. No. 631,422
Int. Cl. G01k 1/02
U.S. Cl. 116—114.5
7 Claims

ABSTRACT OF THE DISCLOSURE

A device for attachment primarily to electrical transformers and sensitive to an overtemperature condition having a permanent magnet attachable to the transformer, an indicator disc which surrounds the magnet, and cover means for the device. A fusible substance melts at the overtemperature to release the cover which may be driven away from the magnet by a spring embedded in the fusible substance.

---

This invention relates to temperature-sensitive devices.

According to the present invention a portable self-contained temperature-sensitive device comprises a thermally conductive element having an external surface for contact with a surface whose temperature is to be sensed, a part which is attached to the element by a substance which will soften at a temperautre to be detected and which part is arranged to move when the substance softens and means for attaching the device to the surface.

Preferably the means for attaching the device are constituted by a permanent magnet which may also constitute the thermally conductive element.

The movable part may be arranged to move by any of various biasing means when the substance softens but the ones most probably used will be gravity or a spring. For example the spring may be embedded in the softenable substance. The softenable substance may be wax such as one of the commercially available fully refined paraffin waxes which melt over very narrow and closely defined ranges of temperature.

In operation the device will function to indicate whether, at any time since the device was positioned on the surface, the temperautre of the surface has become sufficiently high for the substance to soften or fuse. The device may be used for various purposes but is particularly valuable for determining whether or not a transformer has exceeded a predetermined temperature. Such a knowledge is particularly useful in relation to distribution transformers such as pole-mounted transformers. Since temperature and time are the factors governing the life of a transformer, such knowledge is more valuable than a knowledge of the electrical load since it takes into account the efficiency of cooling.

Figure 1:
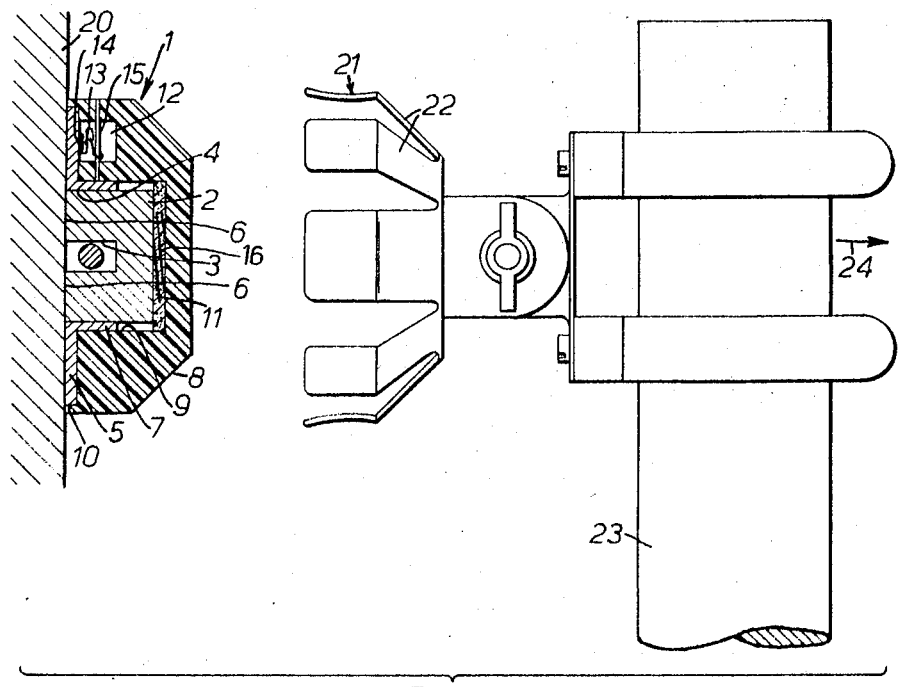
Figure 2:
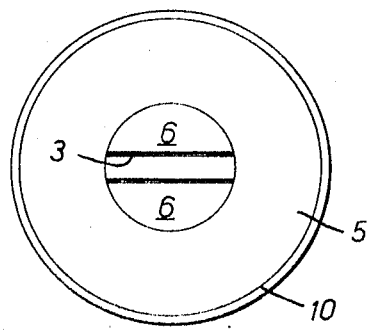

The invention may be carried into practice in a number of ways but one particular device embodying the invention will now be described by way of example with reference to the accompanying drawings, in which:

FIGURE 1 is a side view showing in axial section a temperature-sensitive device in position on a surface whose temperature is to be sensed and showing in elevation an attachment for positioning the device; and FIGURE 2 is a rear elevation of the device viewed from the left in FIGURE 1.

The temperature-sensitive device 1 includes a button magnet 2 formed by a short cylinder having a diametrical slot 3 in one end face. This cylindrical magnet is pressed into a circular central hole 4 in a brightly coloured polystyrene indicator disc 5, the pole surfaces 6 of the magnet being flush with one face of the disc and the magnet being gripped by a cylindrical flange 7 on the disc surrounding the hole on the other face.

The device includes a cover 8 of expanded polystyrene having a central blind bore 9 to receive the magnet and a counterbore 10 to receive the disc, the depth of the counterbore being equal to the thickness of the disc. The depth of the central bore is such that there is a small clearance between the end face of the magnet opposite to the pole face 6 and the bottom of the recess and this is occupied by wax 11 which adheres to the magnet and the cover to hold the cover in place against the bias of a light spring 16 which is embedded in the wax and which tends to push the cover off the magnet. The wax is one which melts over a very narrow and closely defined range. A further small recess 12 in the cover houses a light chain 13 one end of which is fixed at a point 14 to the indicator disc 5 and the other end of which is connected to a pin 15 fixed in the cover.

A particularly valuable use for the device is for sensing overheating of pole-mounted transformers. To attach the device to the outer surface of the side wall 20 of the oil tank of such a transformer, the cover is gripped in a cup 21 formed with spring fingers 22 and mounted on the end of a resin-bonded glass fibre pole 23 with the pole face 6 of the magnet facing outwards at right angles to the axis of the pole. When the device is applied to the tank the magnet will be attracted to the tank with a force which is sufficient to hold the device on the tank but is light enough to enable the device to be slid over the surface of the tank to the required position. The cup 21 can be removed from the device without separating the device from the tank by smart withdrawal of the cup away from the device in the direction of the arrow 24.

The device will remain in position substantially without effect from the elements. When the temperature of the oil in the tank reaches a certain temperature the wax 11 will melt and the light spring will push off the cover 8 which will fall away from the magnet to expose the brightly coloured indicator disc 5. The cover can only drop the distance permitted by an elongated flexible member, such as the chain 13, so it will not be lost. Visual examination of the device from the ground at intervals will reveal whether or not the disc has been exposed and hence whether or not the transformer has reached a certain temperature since the last examination.

The melting point of the wax has to be so selected that it will indicate a particular winding hot-spot temperature as the temperature of the wax will be substantially lower than the hot-spot temperature. These figures can be determined by suitable experiments.

Preferably the device is placed on the north side of the transformer tank so as to be shaded from the sun and is placed at a level which is between the surface of the oil in the tank and six inches below this surface.

What we claim as our invention and desired to secure by Letters Patent is:

1. A portable self-contained temperature-sensitive device comprising a magnet, an indicator disc surrounding said magnet, a cover extending over said magnet and said disc to leave exposed a pole face of said magnet by which the device can be attached to a surface, an elongated flexible member connecting said cover to said indicator disc, said cover being secured to said magnet by a softenable substance, a biasing means in said softenable substance and pressing against said cover, said substance softening at a predetermined temperature, and said cover being released from said magnet when said substance softens.

2. A device according to claim 1 wherein said biasing means is a spring embedded in said substance and arranged to move the cover off said magnet and said disc on softening of said substance.

3. A device according to claim 2 in which said substance is wax.

4. A portable self-contained temperature sensitive device, comprising; a permanent magnet having an exposed pole face for attachment of the device to a surface, a generally cup-shaped cover of thermally insulating material and having a normal position in which said cover encloses the outer surfaces of said magnet other than said exposed pole face, means coacting between said magnet and said cover tending to separate the two and fusible means joining said cover to said magnet, said fusible means fusing at a temperature to be detected to release said cover from said magnet to cause said cover to fall completely clear of said magnet.

5. A device according to claim 4 further comprising an annular indicator disc, said magnet extending through said annular portion of said disc to secure it to said surface, said disc being covered by said cover when said cover is in said normal position and exposed to view when said cover is released on fusion of said fusible means.

6. A device according to claim 4 wherein said fusible means is a wax which adheres to said magnet and said cover.

7. A portable self-contained temperature sensitive device comprising a cylindrical permanent magnet having a first end, a second end and side surfaces, said first end constituting an exposed pole face, an annular indicator member having a flange which is secured to said magnet and extends outwards from said magnet approximately in the plane of said second end, a generally cup-shaped cover of thermally insulating material and having a normal position in which said cover encloses said second end and said side surfaces of said magnet and the surface of said flange facing in the same direction as said second end, an elongated flexible member connecting said cover to said magnet, a spring positioned between said second end of said magnet and said cover and biasing said cover away from said magnet, and fusible means joining said cover to said magnet and holding said cover in said normal position against the bias of said spring, said fusible means fusing at a temperature to be detected and releasing said cover from said magnet to expose said indicator flange.

References Cited

UNITED STATES PATENTS

| | | | |
|---|---|---|---|
| 945,978 | 1/1910 | Neilsen et al. | 116—114.5 |
| 1,778,481 | 10/1930 | Boucher | 335—285 X |
| 2,153,692 | 4/1939 | Hyatt | 116—114.5 |
| 2,350,637 | 6/1944 | Pittman | 116—114.5 |
| 2,362,423 | 11/1944 | Walsh | 116—114.5 |
| 2,431,827 | 12/1947 | Rado | 116—114 |
| 2,478,117 | 8/1949 | Mesh | 335—208 |
| 3,192,890 | 7/1965 | Smith | 116—106 X |

LOUIS R. PRINCE, Primary Examiner

DANIEL M. YASICH, Assistant Examiner

U.S. Cl. X.R.

73—358